(12) United States Patent
Rider et al.

(10) Patent No.: US 10,748,167 B1
(45) Date of Patent: Aug. 18, 2020

(54) MULTIPLE CHIP PAYMENT CARD

(71) Applicant: Capital One Services, LLC, McLean, VA (US)

(72) Inventors: Jonathan Rider, McLean, VA (US); Melissa Crawford, Arlington, VA (US); James Montgomery, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/687,952

(22) Filed: Nov. 19, 2019

(51) Int. Cl.
| | | |
|---|---|---|
| *G06K 5/00* | (2006.01) | |
| *G06Q 30/02* | (2012.01) | |
| *G06Q 20/10* | (2012.01) | |
| *G06F 21/35* | (2013.01) | |
| *G06Q 20/22* | (2012.01) | |
| *G06Q 40/02* | (2012.01) | |

(52) U.S. Cl.
CPC ......... *G06Q 30/0207* (2013.01); *G06F 21/35* (2013.01); *G06Q 20/10* (2013.01); *G06Q 20/227* (2013.01); *G06Q 40/02* (2013.01)

(58) Field of Classification Search
CPC ...... H01Q 1/2216; H01Q 7/00; H01Q 1/2225; H01Q 1/2283; H01Q 21/29; H01Q 21/30; H04N 1/00761; H04N 1/00819; H04N 1/00018; H04N 1/00034; H04N 1/00045; H04N 1/00063; H04N 1/00092; H04N 1/00702; H04N 1/00774; H04N 1/0473; H04N 1/053; H04N 1/1235; H04N 2201/0006; H04N 2201/0094; H04N 2201/044; H04N 2201/0448; H04N 2201/04715; G06K 19/077; G06K 19/07739; G06K 19/07743; G06K 19/07769; G06K 19/07783; G06K 19/07794; G06K 7/0034; G06K 7/10336; G06K 7/10356; G06Q 20/341
See application file for complete search history.

(56) References Cited

U.S. PATENT DOCUMENTS

| | | | |
|---|---|---|---|
| 4,443,027 A | 4/1984 | McNeely et al. | |
| 5,396,617 A * | 3/1995 | Villwock | G06F 3/0601 710/62 |
| 6,193,163 B1 * | 2/2001 | Fehrman | G06K 19/077 235/441 |
| 8,622,308 B1 | 1/2014 | Field et al. | |
| 9,183,487 B2 | 11/2015 | Aiyer et al. | |
| 10,276,976 B1 * | 4/2019 | Phillips | H01R 13/629 |
| 10,282,536 B1 | 5/2019 | Freund | |

(Continued)

*Primary Examiner* — Thien M Le
(74) *Attorney, Agent, or Firm* — Banner & Witcoff, Ltd.

(57) ABSTRACT

Aspects described herein may provide a payment card having a base, a cavity positioned within the base, a wheel positioned within the cavity, a coupling component coupling the wheel to the base, a first microchip coupled to the wheel, and a second microchip coupled to the wheel. The first microchip may be associated with a first financial account and/or a first rewards offer and the second microchip may be associated with a second, different financial account and/or a second, different rewards offer. The wheel may be rotated to select between the first and second microchips, thereby allowing a financial transaction to be conducted using the selected microchip while reaping the benefits of the corresponding rewards offer.

20 Claims, 5 Drawing Sheets

(56) References Cited

U.S. PATENT DOCUMENTS

| | | | | |
|---|---|---|---|---|
| 2015/0356334 A1* | 12/2015 | Leutgeb | ................ | H01Q 21/30 235/439 |
| 2019/0114526 A1* | 4/2019 | Finn | ................ | G06K 19/07794 |
| 2019/0166274 A1* | 5/2019 | Ishii | ................... | H04N 1/00034 |
| 2019/0166275 A1* | 5/2019 | Ishii | ................... | H04N 1/00018 |
| 2020/0005579 A1* | 1/2020 | Vu | ......................... | G07F 7/025 |

* cited by examiner

MULTIPLE CHIP PAYMENT CARD

FIELD OF USE

Aspects of the disclosure relate generally to payment cards. More specifically, aspects of the disclosure may provide access to multiple different financial accounts through a single payment card.

BACKGROUND

An individual is typically issued a separate payment card (e.g., credit card) for each different financial account associated with the individual. That is, an individual is issued a first payment card associated with a first account and/or first financial institution and is issued a second, different payment card associated with a second, different account and/or second, different financial institution. The individual is therefore required to carry around a large number of payment cards in order to have a choice as to which financial account to use to conduct a particular financial transaction. Requiring an individual to carry around a large number of payment cards may be inconvenient to the individual. In many instances, an individual may elect to carry around fewer than all of the payment cards issued to the individual. As a result, the individual may conduct a financial transaction with a payment card that does not provide a reward or other incentive for the transaction. Consequently, the individual may miss out on a reward or other incentive opportunity available through a payment card the individual is not carrying around.

Aspects described herein may address these and other problems, and generally improve the experience of an individual in being provided access to multiple different financial accounts.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide a multiple microchip (multi-chip) payment card (or multiple account payment card), allowing an individual to use any one of a plurality of microchips provided on the multi-chip payment card to conduct a financial transaction. According to some aspects, these and other benefits may be achieved by a payment card having a base, a cavity positioned within the base, a wheel positioned within the cavity, a coupling component coupling the wheel to the base, a first microchip coupled to the wheel, and a second microchip coupled to the wheel. The wheel may be rotated to select either the first or second microchip to be read by a microchip reader. The first microchip may be associated with a first financial account and/or a first rewards offer. The first microchip may provide first information associated with the first financial account when the first microchip is engaged by the microchip reader, thereby allowing a financial transaction to be conducted based on the first microchip while reaping the benefits of the first rewards offer. The second microchip may be associated with a second, different financial account and/or a second, different rewards offer. The second microchip may provide second, different information associated with the second financial account when the second microchip is engaged by the microchip reader, thereby allowing a financial transaction to be conducted based on the second microchip while reaping the benefits of the second rewards offer.

Some aspects described herein may provide a system for conducting a financial transaction using a multi-chip payment card. The system may include a payment card reader and a multiple account (multi-account) payment card (or multi-chip payment card). The multi-account payment card may have a plurality of microchips coupled to a wheel, wherein each microchip of the plurality of microchips is associated with a different corresponding financial account. The payment card reader may be configured to read a microchip located at a first position on a payment card. The wheel of the multi-account payment card may be configured to rotate to position one of the plurality of microchips in the first position, thereby enabling a financial transaction to be conducted based on the financial account corresponding to the one of the plurality of microchips in the first position.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to a payment card providing access to multiple different microchips and/or accounts. Each microchip of the payment card may be associated with its own financial account and/or financial institution. Further, each microchip of the payment card may be associated with its own benefits (e.g., rewards offer) for being used to conduct a financial transaction. The payment card therefore allows a user to reap the benefits of a particular rewards offer associated with a particular financial account and/or financial institution by selecting the microchip best suited for a certain financial transaction, without a need to carry around a separate payment card for each microchip. Aspects discussed herein describe a convenient manner for an individual to select a microchip for a particular transaction and to shield the other microchips when the payment card is provided to a payment card reader. Aspects discussed herein describe a payment card having a plurality of microchips configured for easy and efficient use while still retaining the same size, shape, and/or form factor as a conventional payment card (e.g., credit card).

Before discussing these concepts in greater detail, however, several examples of a computing device that may be used in implementing and/or otherwise providing various aspects of the disclosure will first be discussed with respect to FIG. 1.

Figure 1:
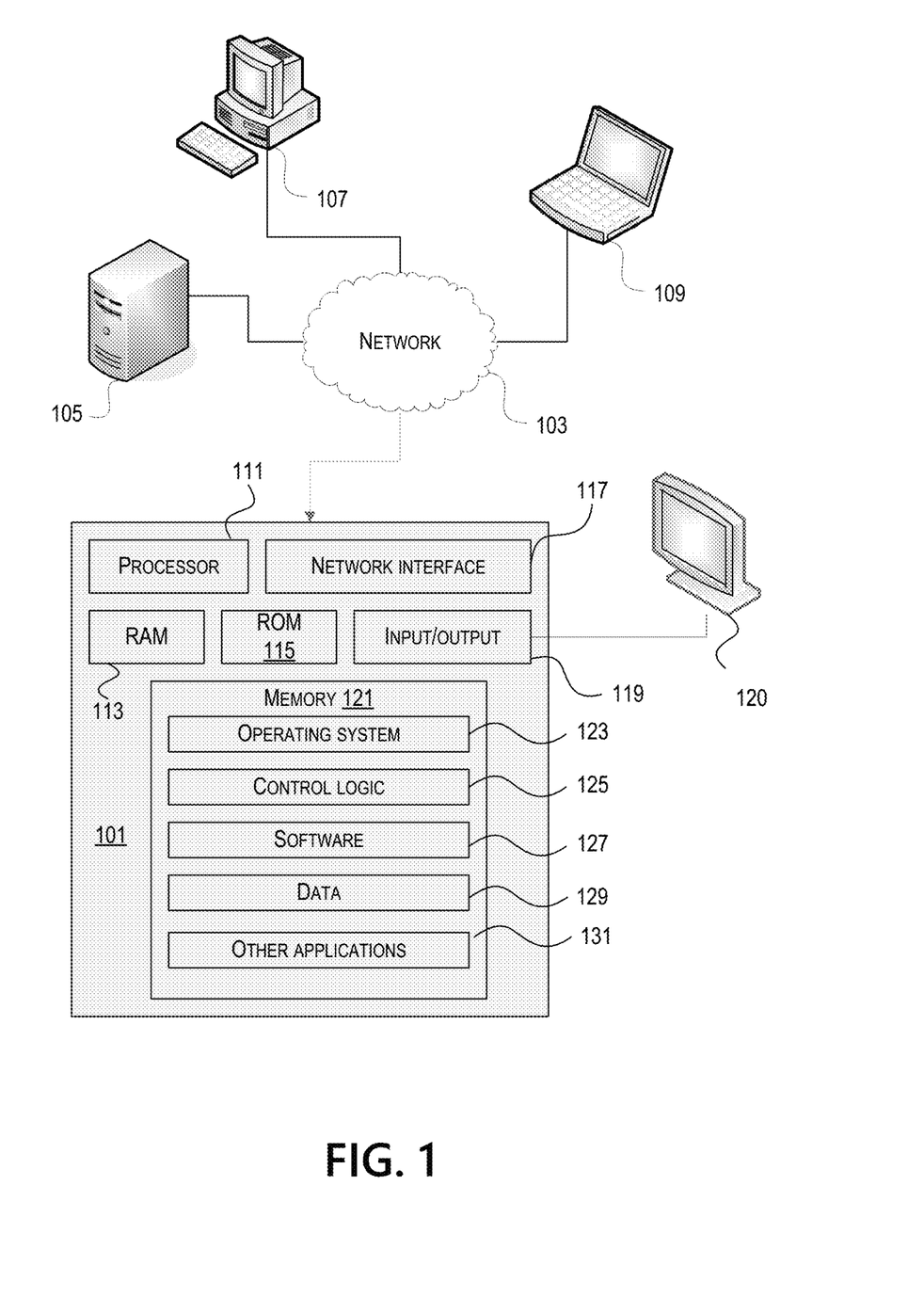
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an example arrangement for enabling a financial transaction to be conducted based on a multi-chip payment card.

Figure 2:
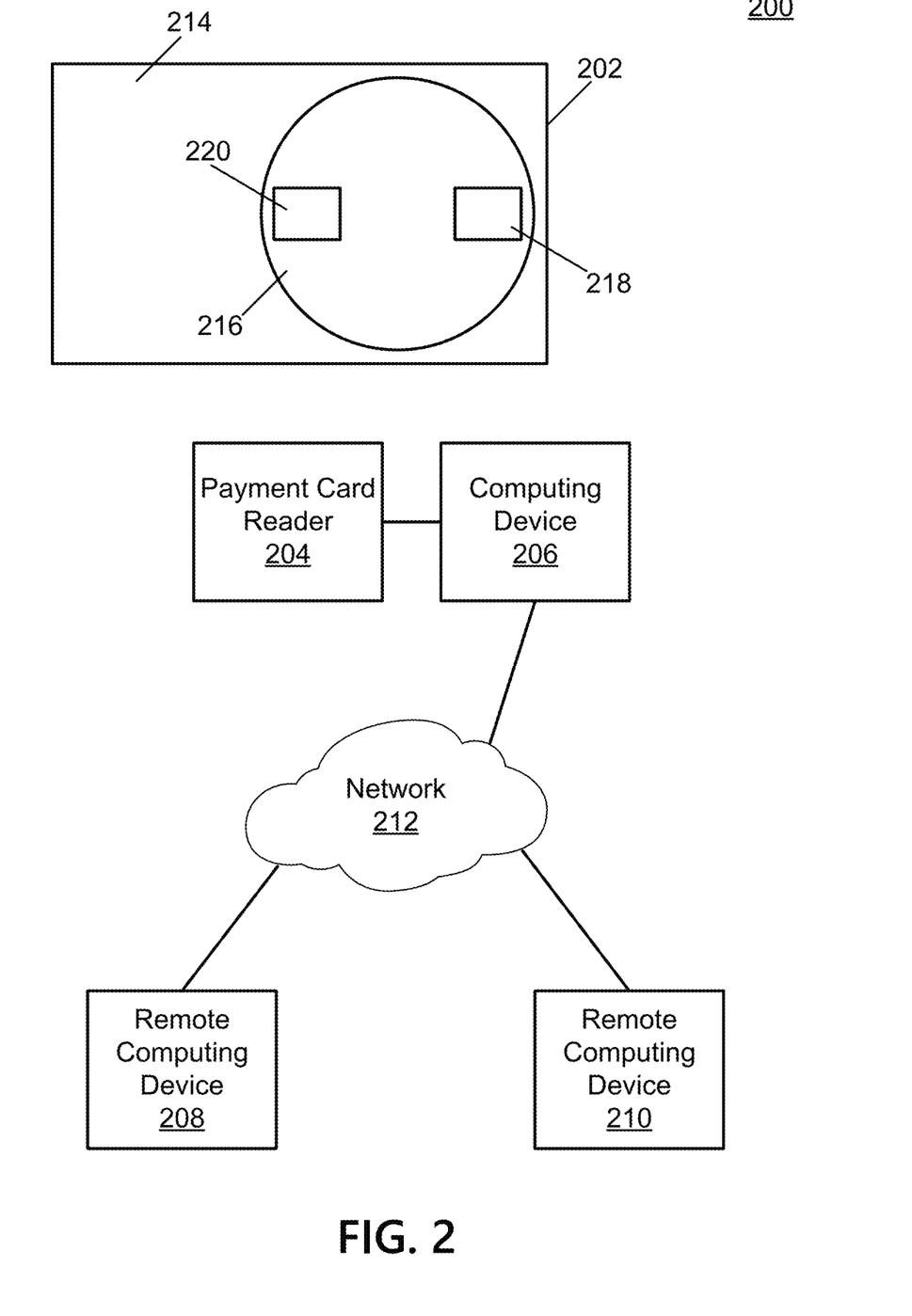
FIG. 2 illustrates a system for conducting a financial transaction using a multiple microchip (multi-chip) payment card according to one or more aspects of the disclosure.

FIG. 2 illustrates a system 200 for conducting a financial transaction using a multiple microchip (multi-chip) payment card 202 in accordance with one or more aspects described herein. The system 200 may include a payment card reader 204, a computing device 206, a first remote computing device 208, a second remote computing device 210, and a network 212.

The payment card reader 204 may be any type of computing device including any computing device depicted and described in relation to FIG. 1. The payment card reader 204 may be configured to read a microchip of a payment card. In various embodiments, the payment card reader 204 may be configured to read and/or receive information from a microchip of a payment card. In various embodiments, the information may include financial information including, for example, information related to a financial account associated with the microchip, authorization and/or security information related to a financial transaction and/or the microchip, and/or any other type of information related to a financial transaction that may be provided by a microchip of a payment card. In various embodiments, by reading the microchip of a payment card, the payment card reader 204 facilitates a financial transaction.

The payment card reader 204 may be coupled to the computing device 206. The computing device 206 may be any type of computing device including any computing device depicted and described in relation to FIG. 1. The computing device 206 may receive information regarding a financial transaction and/or any information associated with a microchip of a payment card read by the payment card reader 204. Any information received by the computing device 206 may be stored by the computing device. Any information received by the computing device 206 may be provided to the first remote computing device 208 and/or the second remote computing device 210 via the network 212.

In various embodiments, the payment card reader 204 and the computing device 206 may be combined (e.g., as a single device) and/or the payment card reader 204 may be a part of the computing device 206. The first remote computing device 208 may be any type of computing device including any computing device depicted and described in relation to FIG. 1. The second remote computing device 210 may be any type of computing device including any computing device depicted and described in relation to FIG. 1.

The network 212 may be any type of communications and/or computer network. The network 212 may include any type of communication mediums and/or may be based on any type of communication standards or protocols. The network 212 may represent an instance of the network 103 FIG. 1. The network 212 communicatively couples the computing device 206 to the first remote computing device 208 and the second remote computing device 210. The system 200 is not limited to the first remote computing device 208 and the second remote computing device 210 as any number of remote computing devices may be communicatively coupled to the computing device 206 via the network 212.

The multi-chip payment card 202 may include a base 214, a wheel 216, a first microchip 218, and a second microchip 218. The first and second microchips 218 and 220 may be coupled to the wheel 216. The wheel 216 may be coupled to the base 214 and may rotate about the base 214. When the wheel 216 rotates, the first and second microchips 218 and 220 correspondingly rotate about the base 214 and, for example, correspondingly rotate about the base 214 relative to one another (e.g., about their fixed positions on the wheel 216).

The first microchip 218 may be considered to be in a first position. The first position may be a position in which a microchip of the multi-chip payment card 202 may be read by the payment card reader 204. The first position may entail a microchip of the multi-chip payment card 202 being positioned closer to an outer edge or boundary of the multi-chip payment card 202 (e.g., relative to any other microchip of the multi-chip payment card 202), for example, so that it may be accessible to the payment card reader 204.

The second microchip 220 may be considered to be in a second position. The second position may be a position in which a microchip of the multi-chip payment card 202 may not be read by the payment card reader 204. The second position may entail a microchip of the multi-chip payment card 202 being positioned further from an outer edge or boundary of the multi-chip payment card 202 (e.g., relative to any other microchip of the multi-chip payment card 202), for example, so that it may not be accessible to the payment card reader 204.

The multi-chip payment card 202 is shown for purposes of illustration and simplicity in FIG. 2 to have only two microchips (e.g., the first and second microchips 218 and 220) but is not so limited. In various embodiments, the multi-chip payment card 202 may include any number of microchips coupled to the wheel 216. In various embodiments, the microchips of the multi-chip payment card 202 may be arranged and/or orientated such that only one microchip of the multi-chip payment card 202 may be read by the payment card reader 204 (e.g., only the microchip positioned in the first position). In various embodiments, any microchips of the multi-chip payment card 202 that are not in the first position may not be read by the payment card reader 204. To enable the payment card reader 204 to read another microchip of the multi-chip payment card 202, the wheel 216 may be rotated to position another microchip in the first position.

The first microchip 218 may be associated with a first financial account. The first financial account may be associated with (e.g., provided and/or serviced by) the first remote computing device 208. The first remote computing device 208 may be affiliated with and/or associated with a first financial institution (e.g., a first bank). In various embodiments, when the first microchip 218 is read by the payment card reader 204, a financial transaction may be conducted based on an interaction between the first microchip 218 and the first remote computing device 208 and/or based on information provided by the first microchip 218 that may be provided to the first remote computing device 208 via the payment card reader 204, the computing device 206, and/or the network 212.

The second microchip 220 may be associated with a second, different financial account. The second financial account may be associated with (e.g., provided and/or serviced by) the second remote computing device 210. The second remote computing device 210 may be affiliated with and/or associated with a second, different financial institution (e.g., a second, different bank). In various embodiments, when the second microchip 220 is read by the payment card reader 204, a financial transaction may be conducted based on an interaction between the second microchip 220 and the second remote computing device 210 and/or based on information provided by the second microchip 220 that may be provided to the second remote computing device 210 via the payment card reader 204, the computing device 206, and/or the network 212.

In various embodiments, an owner and/or user of the multi-chip payment card 202 may be an owner and/or an authorized user of the first account associated with the first microchip 218 and/or the first financial institution associated with the first remote computing device 208. In various embodiments, the owner and/or user of the multi-chip payment card 202 may be an owner and/or an authorized user of the second account associated with the second microchip 220 and/or the second financial institution associated with the second remote computing device 210.

In various embodiments, the owner and/or user of the multi-chip payment card 202 may chose to conduct a financial transaction using the first microchip 218 (and therefore using the associated first financial account) or using the second microchip 220 (and therefore using the associated second financial account). The owner and/or user of the multi-chip payment card 202 may make such determination based on a variety of factors. As an example, the owner and/or user of the multi-chip payment card 202 may make such determination based on a first rewards offer and/or incentive associated with the first microchip 218 (i.e., the first financial account/institution) and/or based on a second rewards offer and/or incentive associated with the second microchip 220 (i.e., the second financial account/institution).

In various embodiments, the first rewards offer and/or incentive associated with the first microchip 218 (i.e., the first financial account/institution) may provide benefits for conducting financial transactions related to dining. In various embodiments, the second rewards offer and/or incentive associated with the second microchip 220 (i.e., the second financial account/institution) may provide benefits for conducting financial transactions related to travel. Accordingly, the owner and/or user of the multi-chip payment card 202 may rotate the wheel 216 to place the first microchip 218 in the first position to conduct a financial transaction with the first microchip 218 (i.e., the first financial account/institution) that is related to dining (e.g., paying for a meal)—to reap the rewards offer and/or incentives provided by first microchip 218 (i.e., the first financial account/institution).

Further, the owner and/or user of the multi-chip payment card 202 may rotate the wheel 216 to place the second microchip 220 in the first position to conduct a financial transaction with the second microchip 220 (i.e., the first financial account/institution) that is related to travel (e.g., paying for a hotel stay)—to reap the rewards offer and/or incentives provided by second microchip 220 (i.e., the second financial account/institution). In this manner, the owner of the multi-chip payment card 202 may direct which microchip and/or financial institution/account is to facilitate a financial transaction using only a single payment card, without the need to carry around multiple payment cards for various different financial accounts.

The multi-chip payment card 202 provides a convenient manner for an owner and/or user of the multi-chip payment card 202 to conduct a financial transaction with any one of a plurality of different financial accounts and/or institutions based on a selected microchip of the multi-chip payment card 202. The multi-chip payment card 202 provides access to a plurality of different financial accounts and/or institutions without the need for the owner and/or user of the multi-chip payment card 202 to carry around a separate card for each different financial account and/or institution. The multi-chip payment card 202 enables the owner and/or user of the multi-chip payment card 202 to quickly and efficiently select a financial account for conducting a transaction by allowing the owner and/or user to rotate the wheel 216 to place a corresponding microchip into position for being read by the payment card reader 204. As each microchip of the multi-chip payment card 202 may be affiliated with a different rewards offer and/or incentive for use, the owner and/or user of the multi-chip payment card 202 may conveniently select the microchip of the multi-chip payment card 202 that maximizes a particular rewards offer and/or incentive for a particular financial transaction.

In various embodiments, the multi-chip payment card 202 may include other information. For example, the multi-chip payment card 202 may include any graphical and/or textual feature. In various embodiments, the multi-chip payment card 202 may include the name of the owner and/or user of the multi-chip payment card 202 and/or may include a name of a provider of the multi-chip payment card 202.

Figure 3:
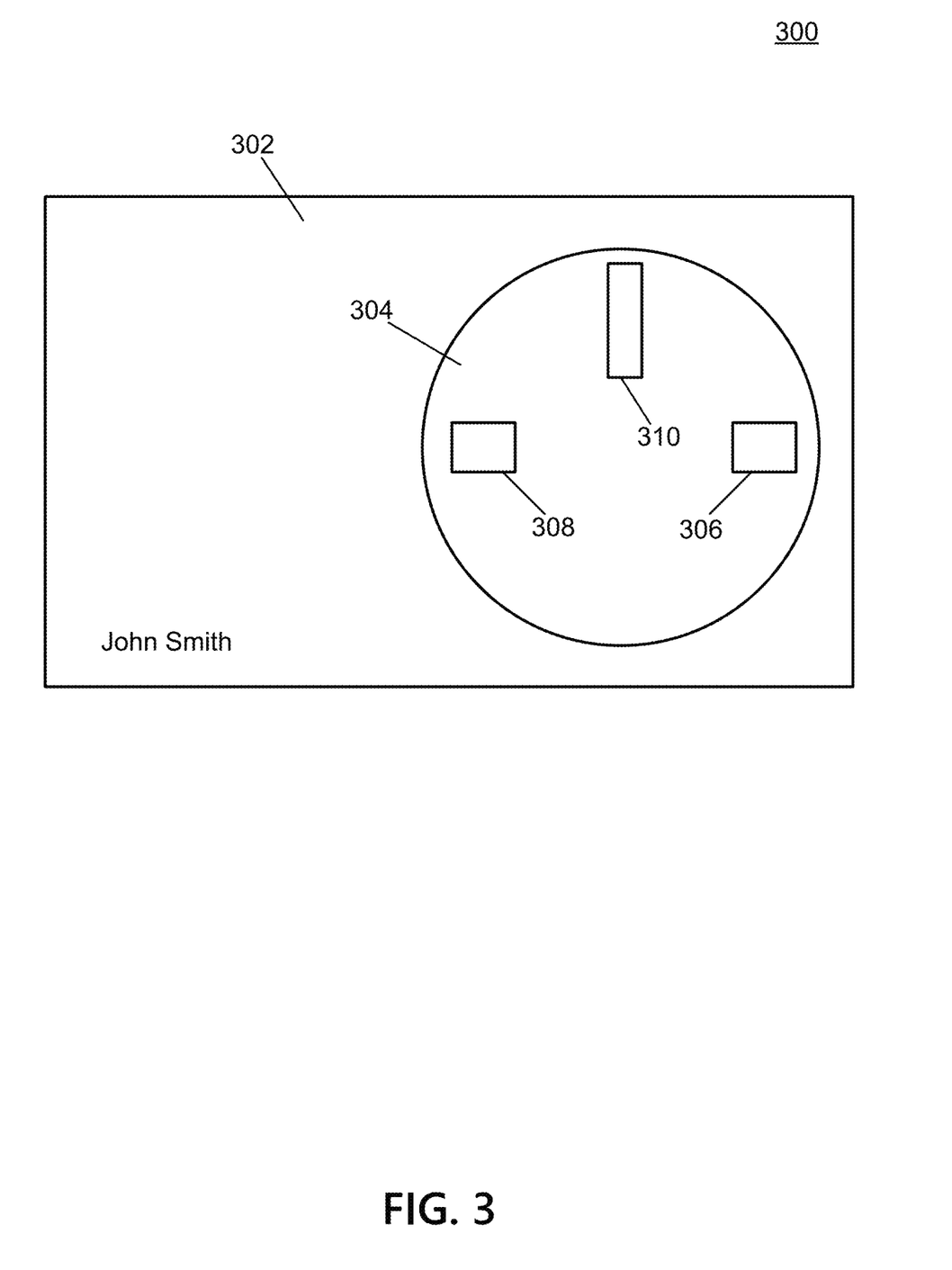
FIG. 3 illustrates a first view of a multi-chip payment card according to one or more aspects of the disclosure.

FIG. 3 illustrates a first view of a multi-chip payment card 300 in accordance with one or more aspects described herein. The multi-chip payment card 300 may be an example configuration of the multi-chip payment card 202. FIG. 3 may provide an overhead view of the multi-chip payment card 300.

As shown in FIG. 3, the multi-chip payment card 300 may include a base 302, a wheel 304, a first microchip 306, a second microchip 308, and a locking component 310. The base 302 may correspond to the base 214. The wheel 304 may correspond to the wheel 216. The first microchip 306 may correspond to the first microchip 218. The second microchip 308 may correspond to the second microchip 220.

In various embodiments, the wheel 304 may be positioned within a cavity (not shown in FIG. 3 for simplicity) of the base 302. In various embodiments, the wheel 304 may be positioned on top of (e.g., over or above) the base 302. The wheel 304 may rotate in either a clockwise or a counter-clockwise direction (e.g., relative to the orientation of the wheel 304 relative to the base 302 as depicted in FIG. 3). The wheel 304 may be coupled to the base 302 by a coupling component (not shown in FIG. 3 for simplicity). The coupling component may allow the wheel 304 to rotate relative to the base 302. In various embodiments, the coupling component may be a pin and/or may comprise a gear system.

The first microchip 306 may be any type of microchip, integrated circuit (IC), and/or magnetic strip. In various embodiments, the first microchip 306 may be a near-field communication (NFC) chip or a radio-frequency identification (RFID) chip. In general, the first microchip 306 may be any device, component, and/or electrical device to facilitate the storage of information and/or to facilitate a financial transaction. The first microchip 306 may be affiliated and/or associated with a first financial account, a first financial institution, a first credit card account and/or company, and/or a first rewards and/or incentives offer.

The second microchip 308 may be any type of microchip, integrated circuit (IC), and/or magnetic strip. In various embodiments, the first microchip 306 may be an NFC chip or an RFID chip. In general, the second microchip 308 may be any device, component, and/or electrical device to facilitate the storage of information and/or to facilitate a financial transaction. The second microchip 308 may be affiliated and/or associated with a second financial account, a second financial institution, a second credit card account and/or company, and/or a second rewards and/or incentives offer.

In various embodiments, one or more of the first and second microchips 306 and 308 may be an EMV (Europay, Mastercard, and Visa) chip that complies with one or more standards for contact and/or contactless cards. In various embodiments, one or more of the first and second microchips 306 and 308 may store information related to a financial account (e.g., information identifying an owner, user, and/or controller of the account). In various embodiments, one or more of the first and second microchips 306 and 308 may generate authorization information (e.g., a transaction code) for any transaction conducted using one of the first and second microchips 306 and 308. In various embodiments, one or more of the first and second microchips 306 and 308 may interact with a payment card reader (e.g., the payment card reader 204) to authorize a certain financial transaction. In various embodiments, one or more of the first and second microchips 306 and 308 may provide, for example, structurally and by operating according to one or more standard or protocols, a secure mechanism to store and exchange sensitive financial account data between a merchant and a customer (e.g., the owner and/or user of the multi-chip payment card 300. In various embodiments, the multi-chip payment card 300 may be any type of card, payment card, smart card, smart payment card, etc.

As shown in FIG. 3, the first microchip 306 is positioned in the first position (e.g., as described in relation to FIG. 2). Accordingly, the first microchip 306 may be read by a payment card reader (e.g., the payment card reader 204) to facilitate a financial transaction. To facilitate a financial transaction using the second microchip 308, the wheel 304 may be rotated to position the second microchip 30 in the first position.

In various embodiments, the locking component 310 may be used to prevent rotation of the wheel 304—for example, to maintain the first microchip 306 in the first position. In various embodiments, the locking component 310 may be a pin or a sliding lock that may be engaged by a user of the multi-chip payment card 300. In various embodiments, the locking component 310 may be a moveable component that, when engaged, may be used to prevent rotation of the wheel 304. In various embodiments, the locking component 310 may be coupled to the wheel 304. In various embodiments, the locking component 310 may be coupled to the coupling component that couples the wheel 304 to the base 302 and, for example, may comprise a gear component or system. In various embodiments, when engaged, the locking component 310 may contact and/or be coupled to a portion of the base 302 to prevent rotation of the wheel 304.

In various embodiments, a label or other indicator may be positioned next to and/or adjacent to each of the first and second microchips 306 and 308. For example, a first label may be positioned in proximity to the first microchip 306 (e.g., coupled to the wheel 304) and may identify the financial account or institution associated with the first microchip 306. A second label may be positioned in proximity to the second microchip 308 (e.g., coupled to the wheel 304) and may identify the financial account or institution associated with the second microchip 308.

In various embodiments, the locking component 310 may be coupled to a label or other indicator that, when engaged to prevent rotation of the wheel 304, indicates the financial account or institution of the microchip positioned in the first position. In this manner, a user of the multi-chip payment card 300 may determine which financial account or institution will be involved with a financial transaction to be conducted with the microchip (e.g., either the first or second microchip 306 and 308) positioned in the first position.

The multi-chip payment card 300 is shown as including the first microchip 306 and the second microchip 308 but is not so limited. In general, the multi-chip payment card 300 may include any number of microchips.

Figure 4:
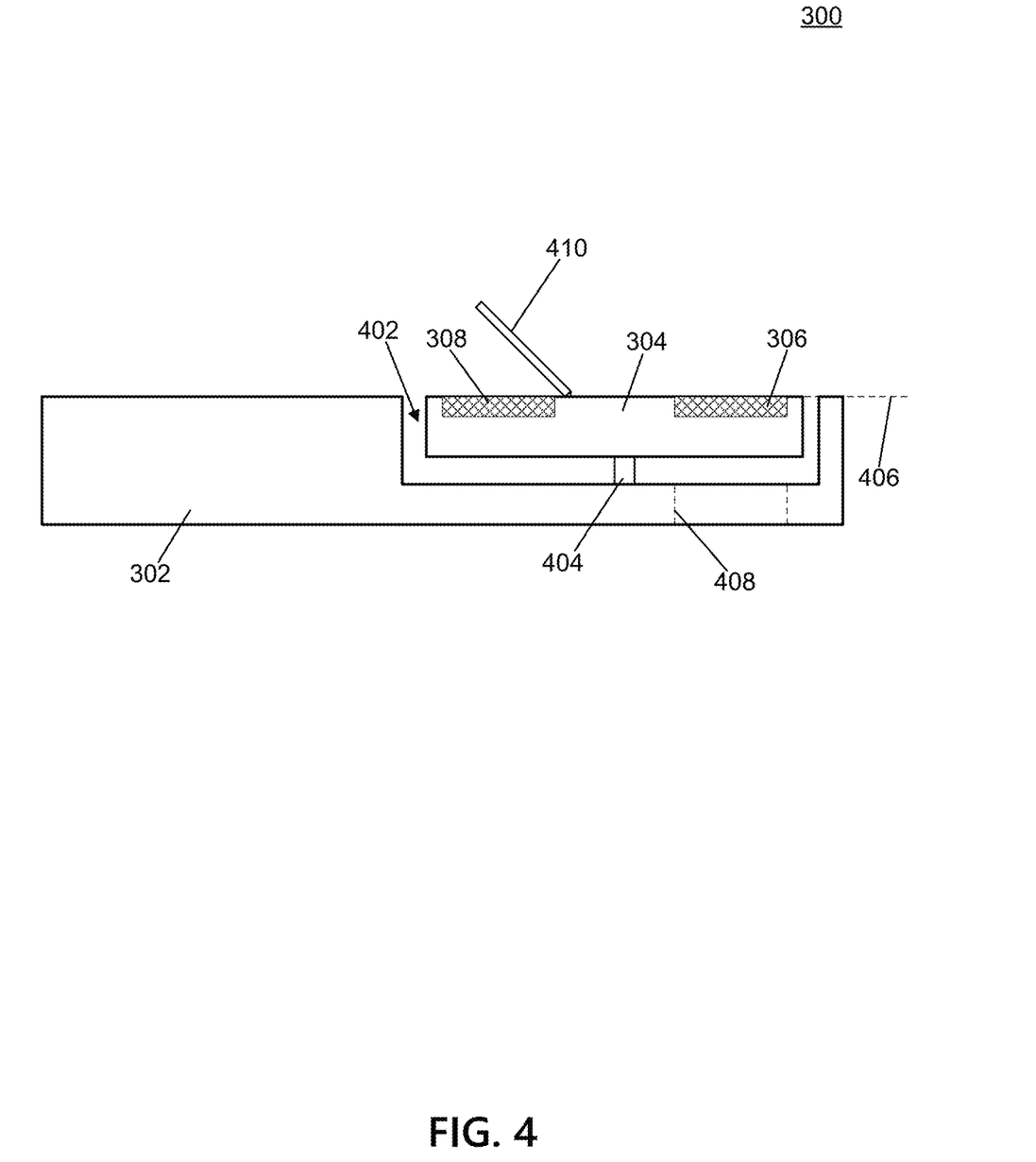
FIG. 4 illustrates a second view of the multi-chip payment card of FIG. 3 according to one or more aspects of the disclosure.

FIG. 4 illustrates a second view of the multi-chip payment card 300 in accordance with one or more aspects described herein. FIG. 4 may provide a side view of the multi-chip payment card 300.

As shown in FIG. 4, the multi-chip payment card 300 may include a cavity 402. The cavity 402 may be positioned within the base 302 of the multi-chip payment card 300 and/or the cavity 402 may be an opening or open area of the base 302. The wheel 304 may be positioned within the cavity 402. The wheel 304 may be coupled to the base 302 by a coupling component 404. In various embodiments, the coupling component 404 may be a pin. In various embodiments, the coupling component 404 may be part of a gear system for rotating the wheel 304. In various embodiments, the coupling component 404 (e.g., as part of a gear system) may be coupled to the locking component 310, thereby allowing engagement of the locking component 310 to prevent rotation of the wheel 304 (e.g., by preventing rotation of the coupling component 404).

In various embodiments, a top surface of the wheel 304 may be level with a top surface of the base 302, as shown by indicator 406. As an example, the top surface of the wheel 304 may be approximately flush with the top surface of the base 302. In various embodiments the top surface of the wheel 304 may be aligned and/or coplanar with the top surface of the base 302. In various embodiments, the top surface of the wheel 304 may extend beyond the top surface of the base 302. As an alternative, the multi-chip payment card 300 may not include the cavity 402 and the wheel 304 may be coupled to a top (e.g., approximately flat) surface of the multi-chip payment card 300 (e.g., via the coupling component 404).

As shown in FIG. 4, the first and second microchips 306 and 308 are coupled to the wheel 304. The first microchip 306 may be considered to be in the first position—that is, positioned so as to be read by a payment card reader (e.g., the payment card reader 204). In various embodiments, a top surface of the first microchip 306 may be exposed to a microchip reader (e.g., the payment card reader 204) when the first microchip 306 is engaged by the microchip reader. The wheel 304 may be rotated to position the second microchip 308 in the first position—that is, positioned so as to be read by a payment card reader (e.g., the payment card reader 204). In various embodiments, a top surface of the second microchip 308 may be exposed to a microchip reader (e.g., the payment card reader 204) when the second microchip 308 is engaged by the microchip reader.

In various embodiments, a bottom surface of the first microchip 306 may be exposed to a microchip reader (e.g., the payment card reader 204) when the first microchip 306 is engaged by the microchip reader. Indicator 408 may indicate an opening or hole within the base 302. The bottom surface of the first microchip 306 may be exposed to the microchip reader via the opening indicated by indicator 408 when the first microchip 306 is engaged by the microchip reader. Similarly, when rotated into proper position, a bottom surface of the second microchip 308 may be exposed to a microchip reader (e.g., the payment card reader 204) via the opening indicated by indicator 408 when the second microchip 308 is engaged by the microchip reader.

In various embodiments, when the first microchip 306 is exposed to and readable by a microchip reader (e.g., the payment card reader 204), the first microchip 306 may provide first information associated with a first financial account to the microchip reader. Further, when the second microchip 308 is exposed to and readable by a microchip reader (e.g., the payment card reader 204), the second microchip 308 may provide second information associated with a second financial account to the microchip reader.

In various embodiments, the multi-chip payment card 300 may include a cover or shield 410. The shield 410 may be coupled to the wheel 304. The shield 410 may be moveable and may be engaged by a user of the multi-chip payment card 300. In various embodiments, the shield 410 may be coupled to the wheel 304 by a hinge or other component. The user of the multi-chip payment card 300 may selectively move the shield 410 to cover the second microchip 308 to protect the second microchip 308 when the second microchip 308 is not to be exposed to a microchip reader.

In various embodiments, a shield may be positioned in proximity to each microchip of the multi-chip payment card 300—for example, a shield may be included for each microchip. In various embodiments, the multi-chip payment card 300 may include a single shield that may be coupled to the base 302 and that may be engaged by a user to cover a microchip of the multi-chip payment card 300 that is not in the first position (e.g., by folding the shield from the base 302 over a portion of the wheel 304 where a microchip is positioned). In various embodiments, the shield 410 may be automatically moved based on a user engaging the locking component 310. That is, engaging the locking component 310 to prevent rotation of the wheel 304 may cause the shield 410 to be automatically moved to cover a microchip of the multi-chip payment card 300.

As shown in FIG. 4, the multi-chip payment card 300 provides the use of multiple different microchips for conducting a financial transaction while retaining a small and thin form factor that may be the same or approximately the same size, shape, and form factor as a conventional payment card (e.g., credit card). In this way, the multi-chip payment card 300 provides the use of multiple different microchips for conducting a financial transaction without requiring any special or customized payment card readers or storage mechanisms when being carried around by a user.

Figure 5:
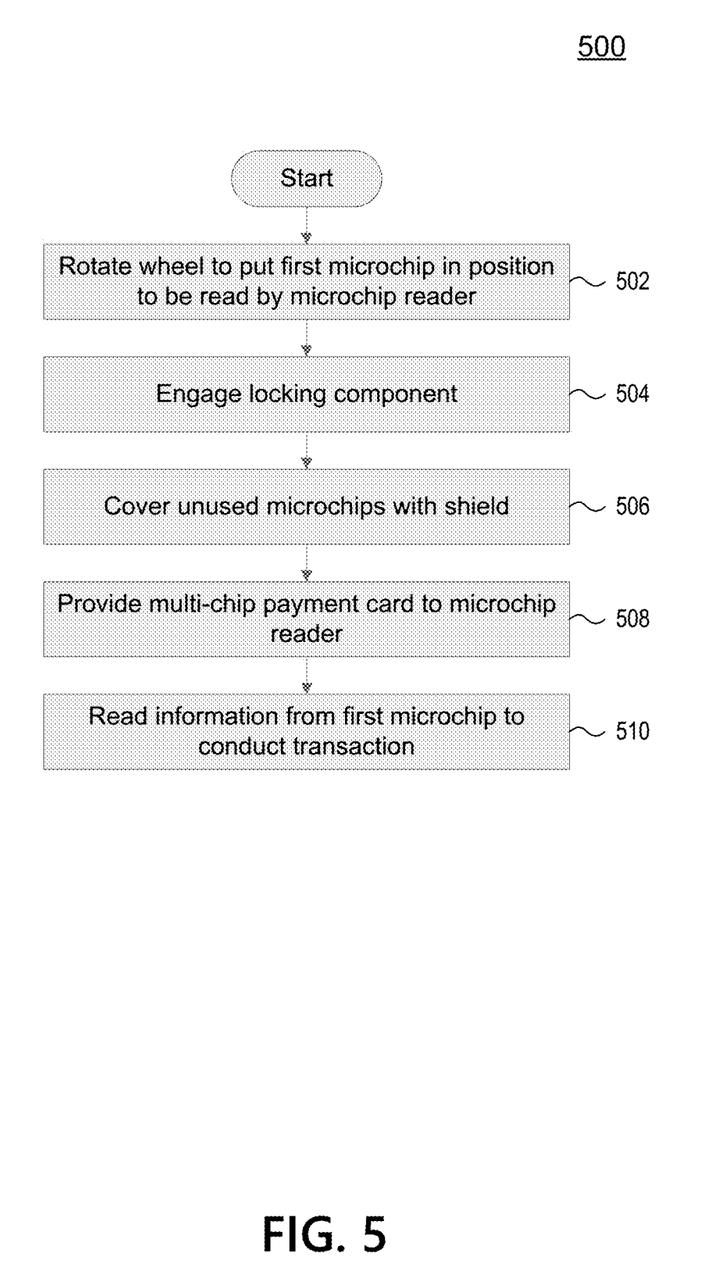
FIG. 5 depicts a flow chart for a method of conducting a financial transaction using a multi-chip payment card according to one or more aspects of the disclosure.

FIG. 5 illustrates an example method 500 for conducting a financial transaction using a multi-chip payment card in accordance with one or more aspects described herein. Method 500 may be implemented at least partially using the multi-chip payment card 202 or multi-chip payment card 300. Method 500 may be implemented at least partially by a suitable computing system, as described herein. For example, method 500 may be implemented at least partially in any suitable computing environment by a computing device and/or combination of computing devices, such as computing devices 101, 105, 107, and 109 of FIG. 1 and/or may be implemented at least partially within the system 200 of FIG. 2. A portion of method 500 may be implemented in suitable program instructions, such as in software 127, and may operate on data, such as data 129.

At step 502, a wheel of the multi-chip payment card may be rotated. The wheel may be disposed within an opening and/or cavity of the multi-chip payment card. The wheel may be rotated in a first direction until a first microchip of a plurality of microchips coupled to the wheel is positioned to be read by a microchip reader (e.g., the payment card reader 204). In various embodiments, the wheel may be rotated until the first microchip is approximately aligned with an outer edge of the multi-chip payment card.

At step 504, a locking component or mechanism of the multi-chip payment card may be engaged. The locking component may prevent rotation of the wheel. The locking component may be engaged when the first microchip is in a position to be read by a microchip reader.

At step 506, one or more shields or covers may be positioned over one or more other microchips of the plurality of microchips other than the first microchip. The one or more shields may prevent exposure of readable surfaces of other microchips of the multi-chip payment card other than the first microchip.

At step 508, the multi-chip payment card may be provided to a microchip reader. In various embodiments, the multi-chip payment card may be inserted into the microchip reader. The multi-chip payment card may be provided to the microchip reader in a manner that enables a top and/or a bottom surface of the first microchip to be exposed (e.g., and therefore readable) to the microchip reader.

At step 510, information stored on the first microchip may be read or otherwise provided to the microchip reader. The information may be first information associated with a first financial account, a first financial institution, and/or a first rewards offer. A financial transaction may be conducted based on the first information.

Some aspects described herein may provide benefits for conducting financial transactions using a financial account best suited for a particular transaction. By providing access to multiple different microchips, each associated with a different account, institution, rewards offer, and/or incentive for use, on a single payment card, a user can conveniently access various different accounts and take advantage of different rewards when conducting a transaction. The payment card provides a convenient and user-friendly manner for selecting between microchips/accounts. Further, the payment card may be provided with a same or similar size, shape, and/or form factor as a conventional payment card, thereby obviating any need for any special or customized payment card readers and enabling the payment card to be used with conventional transaction systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment card comprising:
a base;
a cavity positioned within the base;
a wheel positioned within the cavity;
a coupling component coupling the wheel to the base;
a first microchip coupled to the wheel, wherein the first microchip is associated with a first financial account and is configured to provide first information associated with the first financial account when the first microchip is read by a microchip reader;
a second microchip coupled to the wheel, wherein the second microchip is associated with a second financial account and is configured to provide second financial information associated with the second financial account when the second microchip is read by the microchip reader; and
a shield coupled to one of the base or the wheel by a hinge,
wherein the wheel is configured to rotate about the coupling component to cause one of the first microchip or the second microchip to be in a readable position such that the one of the first microchip or the second microchip can be read by the microchip reader,
wherein the shield is configured to fold over at the hinge to cover the one of the first microchip or the second microchip that is not in the readable position.

2. The payment card of claim 1, wherein a top surface of the wheel is approximately flush with a top surface of the base.

3. The payment card of claim 1, wherein a top surface of the wheel extends beyond a top surface of the base.

4. The payment card of claim 1, further comprising a locking component coupled to the wheel, wherein the locking component, when engaged by a user, prevents rotation of the wheel to maintain the one of the first microchip or the second microchip in the readable position when the one of the first microchip or the second microchip is being read by the microchip reader and, when disengaged by the user, allows the wheel to rotate in a clockwise or a counterclockwise direction.

5. The payment card of claim 4, wherein the locking component comprises a sliding lock.

6. The payment card of claim 4, wherein the locking component comprises a gear system.

7. The payment card of claim 4, wherein the shield is configured to automatically fold over at the hinge to cover the one of the first microchip or the second microchip that is not in the readable position when the user engages the locking component.

8. The payment card of claim 1, wherein a top surface of the one of the first microchip or the second microchip is exposed to the microchip reader when the one of the first microchip or the second microchip is in the readable position and can be read by the microchip reader.

9. The payment card of claim 1, further comprising an opening in the base, wherein a bottom surface of the one of the first microchip or the second microchip is exposed to the microchip reader via the opening in the base when the one of the first microchip or the second microchip is in the readable position and can be read by the microchip reader.

10. The payment card of claim 1, wherein the first financial account is associated with a first rewards offer and the second financial account is associated with a second rewards offer.

11. The payment card of claim 1, wherein each of the first and second microchips is an NFC microchip.

12. The payment card of claim 1, wherein each of the first and second microchips is an RFID microchip.

13. A system comprising:
a payment card reader configured to read a microchip located at a first position on a payment card; and
a multiple account payment card having a plurality of microchips coupled to a wheel, wherein each microchip of the plurality of microchips is associated with a different corresponding financial account, wherein the wheel is configured to rotate to position one of the plurality of microchips in the first position, thereby enabling a financial transaction to be conducted based on the financial account corresponding to the one of the plurality of microchips in the first position, wherein the multiple account payment card comprises:
a locking component coupled to the wheel; and
a shield coupled to the multiple account payment card by a hinge,
wherein the locking component, when engaged by a user, prevents rotation of the wheel to maintain the one of the plurality of microchips in the first position and, when disengaged by the user, allows the wheel to rotate in a clockwise or a counterclockwise direction,
wherein the shield, when engaged by the user, folds over to cover at least one of the plurality of microchips other than the one of the plurality of microchips in the first position.

14. The system of claim 13, wherein a top surface of the one of the plurality of microchips is exposed to the credit card reader when the one of the plurality of microchips is in the first position.

15. The system of claim 13, wherein a bottom surface of the one of the plurality of microchips is exposed to the credit card reader when the one of the plurality of microchips is in the first position.

16. The system of claim 15, further comprising an opening in the multiple account payment card, wherein the bottom surface of the one of the plurality of microchips is exposed to the credit card reader via the opening in the multiple account payment card.

17. The system of claim 13, wherein each financial account is associated with a different corresponding reward offer.

18. The system of claim 13, wherein the shield is configured to automatically fold over to cover the at least one of the plurality of microchips other than the one of the plurality of microchips in the first position when the user engages the locking component.

19. The system of claim 13, wherein the wheel is positioned within a cavity of the multiple account credit card.

20. The system of claim 13, wherein the wheel includes an indication of the financial account associated with the one of the plurality of microchips in the first position.

\* \* \* \* \*